United States Patent
Zachmann et al.

(10) Patent No.: US 11,593,932 B2
(45) Date of Patent: Feb. 28, 2023

(54) LOADING DEEP LEARNING NETWORK MODELS FOR PROCESSING MEDICAL IMAGES

(71) Applicant: INTERNATIONAL BUSINESS MACHINES CORPORATION, Armonk, NY (US)

(72) Inventors: Hans Harald Zachmann, Toronto (CA); Simona Rabinovici-Cohen, Haifa (IL); Shaked Brody, Jerusalem (IL)

(73) Assignee: Merative US L.P., Ann Arbor, MI (US)

( * ) Notice: Subject to any disclaimer, the term of this patent is extended or adjusted under 35 U.S.C. 154(b) by 638 days.

(21) Appl. No.: 16/664,542

(22) Filed: Oct. 25, 2019

(65) Prior Publication Data
US 2021/0125329 A1    Apr. 29, 2021

(51) Int. Cl.
| | |
|---|---|
| *G06N 5/04* | (2006.01) |
| *G06T 7/00* | (2017.01) |
| *G06F 9/455* | (2018.01) |

(52) U.S. Cl.
CPC ........ *G06T 7/0012* (2013.01); *G06F 9/45558* (2013.01); *G06N 5/04* (2013.01); *G06F 2009/4557* (2013.01); *G06F 2009/45575* (2013.01); *G06F 2009/45583* (2013.01); *G06T 2207/20081* (2013.01)

(58) Field of Classification Search
CPC ...... G06T 7/0012; G06F 9/45558; G06N 5/04
See application file for complete search history.

(56) References Cited

U.S. PATENT DOCUMENTS

| | | |
|---|---|---|
| 9,589,374 B1 | 3/2017 | Gao et al. |
| 9,760,807 B2 | 9/2017 | Zhou et al. |
| 2011/0102424 A1* | 5/2011 | Hibbert ................... G06T 15/02 345/419 |
| 2017/0200067 A1 | 7/2017 | Zhou et al. |
| 2017/0220949 A1 | 8/2017 | Feng et al. |

FOREIGN PATENT DOCUMENTS

WO    2018170815 A1    9/2018

OTHER PUBLICATIONS

Gibson, Eli et al., "NiftyNet: a deep-learning platform for medical imaging", Computer Methods and Programs in Biomedicine, vol. 158, (2018), pp. 113-112.

* cited by examiner

*Primary Examiner* — Sam Bhattacharya
(74) *Attorney, Agent, or Firm* — Michael Best & Friedrich LLP

(57) ABSTRACT

Methods and systems for processing medical images. One method includes, in response to startup of an application using an algorithm, creating a server process supporting a programming language associated with the algorithm and loading a plurality of deep learning models used by the algorithm into a memory of the server process to create in-memory models. The method also includes processing a first set of one or more medical images with the server process using the algorithm and at least one model selected from the in-memory models, maintaining the in-memory models in the memory of the server process after processing the first set of one or more medical images, and, in response to a request to process a second set of one or more medical images, processing the second set of one or more medical images using the algorithm and at least one of the in-memory models.

13 Claims, 3 Drawing Sheets

LOADING DEEP LEARNING NETWORK MODELS FOR PROCESSING MEDICAL IMAGES

FIELD

Embodiments described herein generally relate to processing medical images, such as with deep learning networks in large scale deployments, and, in particular, relate to optimizing such processing by loading network models used by an application into memory (for example, one process per programming language) at application startup and, thereafter, using the loaded processes to process multiple medical images.

Medical image processing systems often use one or more models (also referred to herein as "networks" or "network models" interchangeably), such as deep learning networks, to identify certain diseases, suspicious abnormalities, or other characteristics or conditions relevant to diagnostic or therapeutic purposes. It often takes a considerable amount of time (anywhere from a few seconds to many minutes), to load such a model, especially when complex models, such as deep learning models, are used. Also, some image processing systems use multiple different models to process a medical image, which requires loading multiple models into memory. Accordingly, in some situations, the time it takes to load all of the needed models exceeds the time it takes to process a medical image, such as images included in a medical imaging exam.

Furthermore, models may be implemented using different frameworks, such as TensorFlow, PyTorch, Caffe, and others. The algorithms using these models may also be written in different programming languages and have different memory requirements. Because of the different implementations of models, in some situations, models are repeatedly being switched out of memory and reloaded each time a model is needed to process an exam, which can be detrimental to the time needed to process a set of images.

Accordingly, embodiments described herein address the unique challenges of efficiently implementing algorithms that use multiple complex models by loading model sets for each algorithm into computer memory at startup and maintaining the entire model set loaded in memory thereafter for reuse during processing of subsequent images (such as, for example, medical imaging exams). Furthermore, embodiments described herein provide further optimization of such model loading and management by handling models using different frameworks, different memory requirements, or written in different programming languages.

SUMMARY

As noted above, embodiments described herein load models (such as, for example, deep learning models) used by a particular algorithm (executed via a software application) into memory at application startup time. In some embodiments, a server process is created for each programming language associated with the algorithm (the application) and the models. For example, as described in more detail below, a process can be created for running algorithms in Java within a Java virtual machine, and a separate process can also be created for running algorithms in Python. Thereafter, each model is loaded into the memory of the server process associated with the programming language of the model. In some embodiments, other characteristics of the models can also be taken into account when creating separate server processes. For example, in some embodiments, different server processes can be used for different types of model frameworks, different processor requirements or preferences (central processing unit (CPU) or graphics processing unit (GPU)) of the models, different memory requirements or preferences for the models, historical uses of the models, sizes of the models, or the like.

After creating the one or more server processes, these server processes are used for running the algorithm on multiple images, such as multiple medical imaging exams (which may each include one or more images). Therefore, the time spent loading models for processing a plurality of medical imaging exams is reduced as model loading only occurs once, which reduces overhead, makes more efficient use of computing resources, and increases overall processing time. Even if such loading trades memory usage for faster processing time (since enough memory is needed to retain all needed models in memory), in many situations, including medical image processing environments used in diagnostic and therapeutic applications, processing time is more valuable than memory usage. For example, processing time can be more important than memory usage in time-sensitive scenarios, such as emergency situations or other radiology environments where fast turnaround times for reading medical image exams is a requirement.

Furthermore, embodiments described herein, as part of loading the models during startup, can use parameters of each model to allocate a model to a particular CPU, GPU, or combination thereof. In addition, embodiments described herein can control what fraction of a CPU or a GPU is allocated to a particular model. This allocation allows different models from different deep learning frameworks to run in the same process and share resources.

By loading the models into memory at application startup, embodiments described herein can also manage running multiple different algorithms using different model sets being used by different clinical software applications in parallel in a cluster environment while minimizing competition for computing resources. For example, all algorithms used by the same software application can run on a separate computer process, so that algorithms used by different software applications are separately run by different processes and are not impacting the turnaround time of other applications. Each server process can then be run on a different virtual or physical machine. By running the server processes on different virtual or physical machines (different processing nodes), the number of processes available for processing can be controlled and dynamically increased or decreased to avoid wasting resources during times of decreased processing demands.

For example, one embodiment provides a computer-implemented method for medical image processing. The computer-implemented method includes, in response to startup of an application using an algorithm configured to process medical images, creating a server process supporting a programming language associated with the algorithm and loading a plurality of models used by the algorithm into a memory of the server process to create in-memory models, wherein the plurality of models are based on the same or different deep learning frameworks. The method also includes processing a first set of one or more medical images with the server process using the algorithm and at least one model selected from the in-memory models and outputting at least one result of the processing of the first set of one or more medical images. In addition, the method includes maintaining the in-memory models in the memory of the server process after processing the first set of one or more medical images, and, in response to a request to process a second set of one or more medical images, processing the second set of one or more medical images using the algorithm and at least one of the in-memory models. Furthermore, the method includes executing the server process to process one or more additional sets of one or more medical images until explicitly terminated by the application.

Another embodiment provides a system for processing medical imaging exams using a plurality of deep learning models. The system includes an electronic processor. The electronic processor is configured to create, in response to startup of an application using an algorithm configured to process medical images using one or more of a plurality of models, a server process supporting a programming language associated with the algorithm, wherein the plurality of models are based on the same or different deep learning frameworks. The electronic processor is also configured to access a first set of one or more medical images, determine a first set of one or more models included in the plurality of models for processing the first set of one or more medical images, and, in response to the first set of one or more models not being loaded into a memory of the server process, load the first set of one or more models into the memory of the server process to create a first set of in-memory models. In addition, the electronic processor is configured to process the first set of one or more medical images with the server process using the algorithm and the first set of in-memory models, output at least one result of the processing of the first set of one or more medical images, and maintain the first set of in-memory models in the memory of the server process after processing the first set of one or more medical images. The electronic processor is further configured to access a second set of one or more medical images, determine a second set of one or more models included in the plurality of models for processing the second set of one or more medical images, and in response to at least one model in the second set of one or more models not being loaded into the memory of the server process, load the at least one model into the memory of the server process to create a second set of in-memory models. The electronic processor is also configured to process the second set of one or more medical images with the server process using the algorithm, the first set of in-memory models, and the second set of in-memory models and output at least one result of the processing of the second set of one or more medical images. Furthermore, the electronic processor is configured to maintain the first set of in-memory models and the second set of in-memory models in the memory of the server process after processing the second set of one or more medical images and execute the server process to process one or more additional sets of one or more medical images until explicitly terminated by the application.

Yet another embodiment provides a non-transitory, computer-readable medium comprising instructions that, when executed by an electronic processor, perform a set of functions. The set of functions includes, for each of a plurality of algorithms configured to process medical images and in response to startup of each of the plurality of algorithms, creating a set of server processes associated with the algorithm, creating a computing cluster for the algorithm, the computing cluster including one or more processing nodes of a computing system and is associated to the set of server processes created for the algorithm, and loading a plurality of models used by the algorithm into a memory of the set of server process to create in-memory models, wherein the plurality of models are based on the same or different deep learning frameworks. The set of functions also includes processing each of a plurality of sets of one or more medical images with at least one of the plurality of algorithms using the set of server processes and the in-memory models and outputting at least one result of the processing of each of the plurality of sets of one or more medical images. The set of functions further includes executing the set of server processes created for each of the plurality of algorithms to process one or more additional sets of one or more medical images until explicitly terminated, and maintaining the in-memory models in the memory of the sets of server processes until termination of the server process.

Other aspects of the invention will become apparent by consideration of the detailed description and accompanying drawings.

Figure 1:
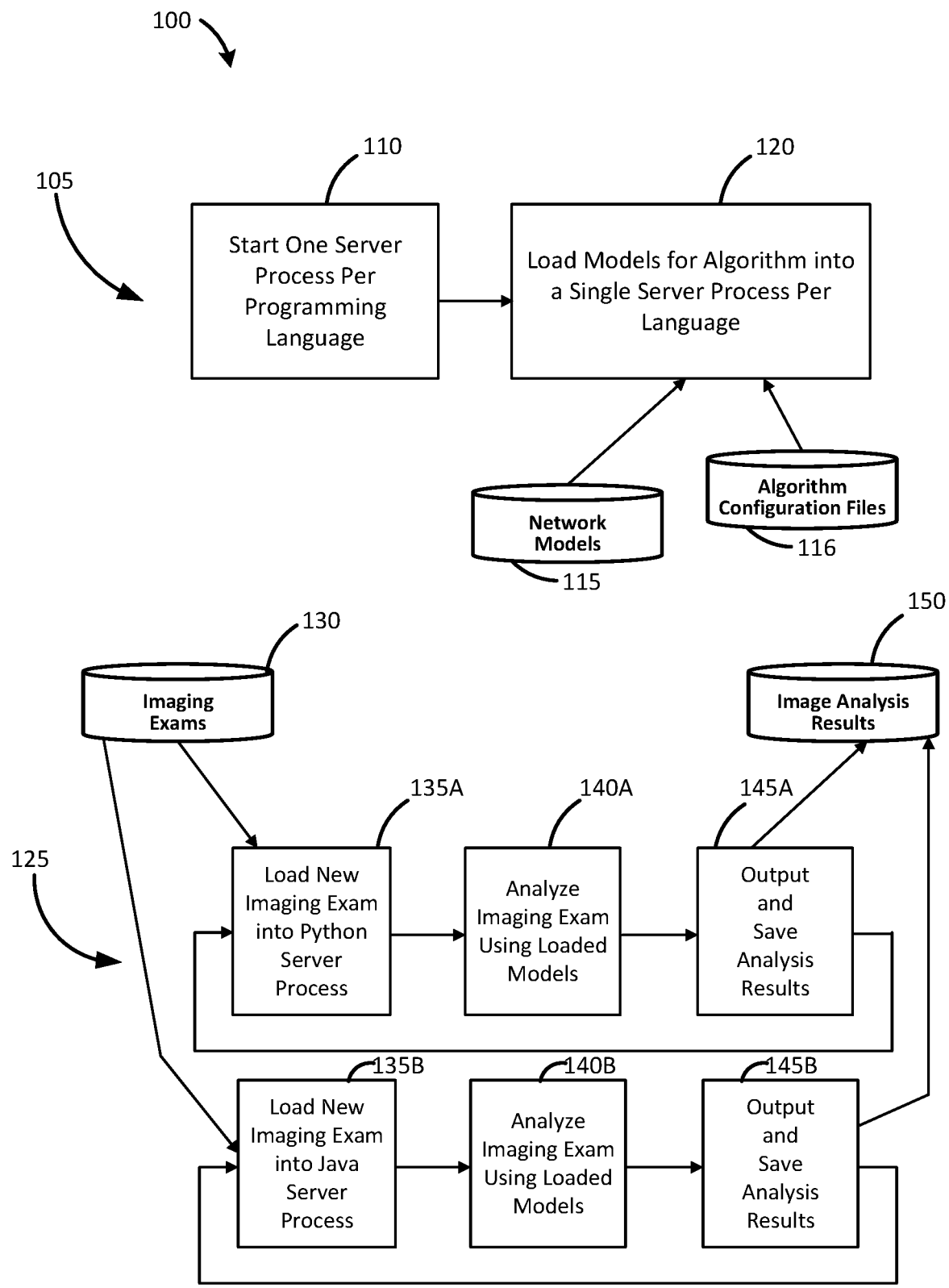
FIG. 1 illustrates a process for analyzing medical exams according to some embodiments.

Other aspects of the invention will become apparent by consideration of the detailed description.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, to improve the processing time associated with processing images, such as medical digital images, embodiments described herein provide methods and systems for performing medical image processing. These methods and systems, in response to startup of an application, create a server process and load each of a plurality of models used by the application in to a memory of the server process. The loaded models (which may be referred to as in-memory models) are retained in memory such that as each of a plurality of images (such as images included in a plurality of medical imaging exams) the needed models are already loaded and ready to process the images. In some embodiments, a plurality of server processes are created at startup, wherein each of the plurality of server processes is associated with a different programming language. These separate server processes allow models expressed in different programming languages to be loaded and allocated to the server process created for the applicable programming language. In some embodiments, server processes are also allocated to one or more particular central processing units (CPUs), one or more particular graphics processing units (GPUs), or a combination thereof. For example, to take advantage of various preferences or requirements of a particular programming language, model framework, or the like, server processes can be allocated accordingly for further optimization. In addition, as models are loaded into the memory of a server process, a model can be allocated to a fraction of a CPU or GPU associated with the server process. After the models are loaded, the models are maintained in the memory (for reuse as part of processing a plurality of images) until the server process is terminated (for example, the application that triggered the creation of the server process at startup.

For example, FIG. 1 illustrates a process 100 for processing medical exams according to some embodiments and, in particular, illustrates a process 100 for analyzing medical imaging exams using multiple different deep learning models 115. As illustrated in FIG. 1, an initialization stage 105 of the process 100 occurs during start-up of an application. The application may be a medical imaging analysis application that uses an algorithm configured to process one or more medical images (for example, a set of related medical images) using one or more of the deep learning models 115. During the initialization stage 105, one or more server process are started (at 110). Before server process creation, computing resources of a computer system are allocated to each server process (which is wrapped in a Docker image, for example), such as allocating memory, identifying a processor (one or more CPUs, one or more GPUs, or a combination thereof) to execute the server process, selecting a virtual machine or physical machine to execute the server process on, creating a server process identification number, and other process creation tasks. Computing resources are allocated based on a configuration file as described below. In some embodiments, these allocations are configured based on experimentally-determined resource requirements per algorithm to process one or more images for a predetermined throughput of images (or exams) per time period (hour). To allocate computing resources and allow for scalable deployment of a variable number of server processes, a technology such as Kubernetes or another container orchestration system may be used.

In some embodiments, each server process is created for a specific programming language based on the configuration file as described below. Different programming languages require different processes or resources as determined by the language. For example, Java programs need a Java virtual machine process to be executed, and Python programs need a python server process as both of these languages are interpreted at run-time by the built-in interpreter for Java and Python. In contrast, C++ programs are executed in a native operating system (OS) process as these programs are compiled into a binary that runs directly on the target hardware. Accordingly, embodiments described herein recognize and account for these differences between programming language by automatically creating a separate server process for each programming language and automatically starting the required processes for the programming language. Accordingly, in some embodiments, all algorithms written in the same language are executed in the same server process on a given machine to share memory and save resource usage.

For example, certain deep learning model frameworks, such as TensorFlow and PyTorch, run in Python. Therefore, in a situation where the set of models used by an algorithm include a model built using the TensorFlow framework and a model build using the PyTorch framework, a Python server process is created and these models (as well as any other models used by the algorithm that run in Python) are loaded into the memory allocated to the Python server process (for example, by an initialization function provided by each algorithm). A configuration file created for a particular algorithm may include an explicit description of relevant properties of each algorithm or algorithm component. The properties may include, for example, in order to properly load the models, characteristics such as an implementation language (for example, Java, Python, C++, or the like), an initial function to run upon process startup to load the relevant models, CPU versus GPU usage, expected memory usage, and expected time to process an image. The software developer can create the configuration file according to this syntax, and these configuration files can be stored (see configuration files 116 illustrated in FIG. 1) and interpreted during the initialization stage 105 (as part of application start-up) to determine which server processes to create, must be created, such as defining a Java server process, a Python server process, a C++ server process, and others.

After the server processes for each programming language are created, the deep learning models 115 (which may be stored in one or more storage locations) are loaded into memory for the respective server process based upon their programming language (at 120). For example, as illustrated in FIG. 1, deep learning models that are implemented as Python models are loaded into the server process for executing Python models.

As part of loading the models 115 (at 120), models may also be allocated to a fraction of a GPU based on the particular deep learning model being run. For example, a deep learning model running in PyTorch may be allocated 25% of a GPU while a model running in TensorFlow may take the remaining 75% of the GPU. This allocation can be performed based on the configuration file associated with each model as described above. This allocation allows different models developed in different frameworks (for example, TensorFlow, PyTorch, or the like) to be run in the same server process and share computing resources.

Various characteristics of a model defined in the configuration file described above may impact how a model is allocated. For example, in some embodiments, a model is allocated based on an amount of memory needed for the model, a size of a digital image being processed, a temporary amount of memory needed to process a digital image with the model, the framework used to build the model, user preferences, or a combination thereof.

After the models 115 are loaded, the loaded models 115 are maintained in memory, therefore, can be used to process multiple medical imaging exams without requiring any subsequent re-loading of each model during an analysis stage (125). In particular, after the models are loaded into their respective server processes, each model can be used to repeatedly process a plurality of medical imaging exams 130 without requiring any subsequent loading or re-loading of models. Because of this, when new processing requests are made (based on the new availability of an exam or as a part of processing an initial set of exams), the models loaded into memory are used to process the new request, saving loading time and associated resources and, therefore, analyzing the exam quickly.

In particular, as illustrated in FIG. 1, the analysis stage 125 includes loading each medical imaging exam of the plurality of medical imaging exams 130 into each server process (such as into the Python server process (at 135A) or into the Java server process (at 135B)). The loaded models in each server process analyze each medical imaging exam 130 (at 140A and/or 140B based on the programming language) and output (and save) the analysis results 150 (at 145A and 145B).

Processing one of the medical imaging exams includes processing the exam by at least one of the loaded deep learning models 115. For example, it should be understood that each medical imaging exam may not be processed by each loaded model, as some models may be applicable to only certain kinds of exams, such as exams taken using certain imaging modalities, using certain contrast agents, of particular anatomical structures or features, or exams concerned with particular medical anomalies, diseases, or other specific categories. Models used to process an image (or a particular image within an exam) may be determined based on one or more characteristics, including, for example, configuration settings (for example, for a particular user, clinic, organization, or the like), based on characteristics of the exam, an image within the exam, patient information, or a combination thereof. These characteristics may be compared with characteristics of the models 115 or be processed via one or more rules to select one or more appropriate models. For example, when a medical imaging exam includes x-ray-images, a model designated as being used for x-ray images, may be selected to process the exam.

The results 150 output from the processing of an exam from the selected model(s) 115 may include data, measurements, highlights of portions of images signifying anatomical structures or abnormalities, characteristics of the highlighted structures or abnormalities, diagnoses, and the like. The results may also indicate which models were applied to the medical imaging exam(s). The results 150 may be stored for later review and analysis, such as by a physician or radiologist, submitted to further systems for additional processing or use (for example, for automated exam report generation), or the like.

In one embodiment, instead of loading every model into memory in response to application startup as described above, models are loaded into memory as they are needed and then retained in memory until the server processes are terminated (for example, by the medical image analysis software application or associated algorithm). For example, when an algorithm applied to a particular medical imaging exam only needs to use three out of a total of ten models and this is the first medical imaging exam being processed within a created server process, processing time is reduced by only loading the three needed models for execution by the server process but, thereafter, retaining the loaded models in memory for subsequent reuse (for example, until the server process is terminated). In other words, when an exam needs to be processed by a model that has not yet been loaded (a needed model), that needed model is loaded into the server process associated with the programming language of the model and then, after analyzing the medical imaging exam, is kept in memory for re-use with further medical imaging exams. In this implementation, to save even further processing time, server processes for particular programming languages may not, in some embodiments, be created until a medical imaging exam requires a particular model that uses that particular programming language for analysis. For example, when a first medical imaging exam only requires models that use the Python programming language, the server process for the Python programming language is created wherein a server process for other programming languages, such as C++, are not created until a medical imaging exam being processed via the application needs a model that uses C++.

In some embodiments, it may not be practical or even possible to have one or more different algorithms running on a single server due to the large amount of memory needed for loading all of the required deep learning models. This particularly applies to algorithms that are executed on GPUs, which have limited random access memory ("RAM"). Accordingly, in some embodiments multiple different algorithms can be run on a distributed computing network or system. In this situation, computing resources can be portioned into various computing clusters, wherein each computing cluster is used to run a particular algorithm or related set of algorithms that are different from algorithms run in a separate cluster. Allocating resources in this way keeps algorithms from competing for the same resources, and, therefore, allows for efficient parallel execution of multiple algorithms while still increasing computing speed. Also, in some embodiments, these computing clusters can be further divided among different customers with different performance priorities. In this configuration, different clusters could run the same one or more algorithms but for different customers. A cluster manager can scale the resources for each cluster independently to adapt to the specific load on each cluster and keep the required processing times within the allowed limits for the particular cluster.

Figure 2:
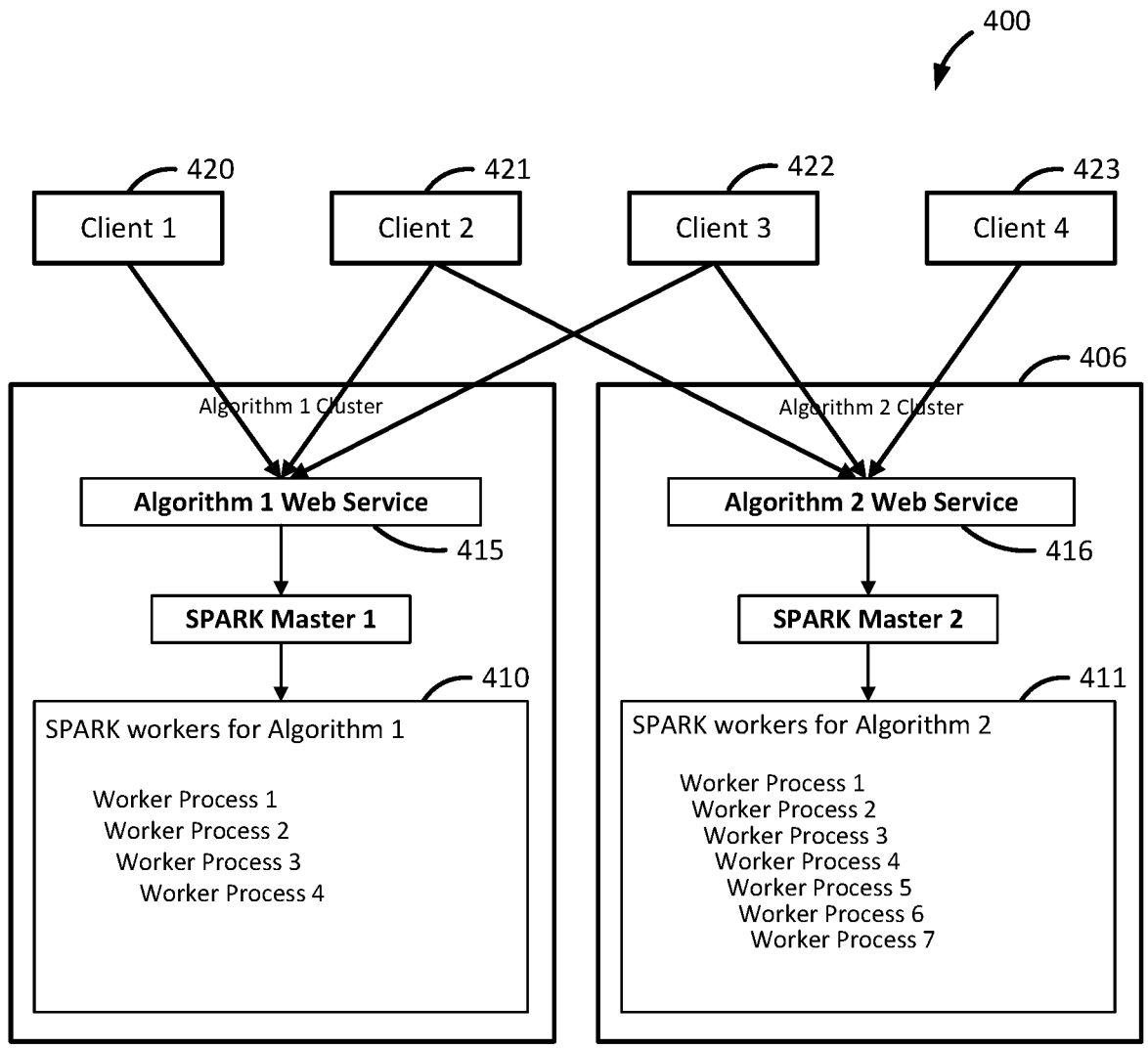
FIG. 2 illustrates a set of computing clusters according to some embodiments.

For example, FIG. 2 illustrates an example set of computing clusters 400. The set 400 is illustrated in FIG. 2 as including cluster 405 and cluster 406. Each computing cluster 405 and 406 includes a scalable number of processing nodes 410 and 411. The processing nodes 410 and 411 contain the server processes assigned to the computing clusters 405 and 406. For example, computing cluster 405 includes four server processes in the processing nodes 410 and computing cluster 406 includes seven server processes in the processing nodes 411. Each processing node of the processing nodes 410 and 411 runs one of the server processes. In some embodiments, each computing cluster 405 and 406 includes a web service 415 and 416 that allows one or more client devices 420-423 to access the server processes associated with each algorithm. In this way, the client devices 420-423 are isolated from the details of how the algorithms are run in a distributed fashion.

In some embodiments, the processing nodes 410 and 411 of the computing clusters 405 and 406 are scalable. In other words, the resources committed to each computing cluster 405 and 406 (the number of processing nodes) can be controlled. In one embodiment, the processing nodes 410 and 411 includes any physical processors from a CPU or GPU assigned to process the set of server processes. In other embodiments, the processing nodes 410 and 411 include virtual machines. When the processing nodes 410 and 411 include virtual machines, the number of virtual machines assigned to the processing nodes 410 and 411 can automatically be increased or decreased by a cluster management service, such as Kubernetes, based on an average number of processing requests for each algorithm, length of processing queues, average wait times for each algorithm, average time to complete processing requests, or other metrics. For example, in some embodiments, the number of processing nodes within computing cluster can be automatically scaled based on any metric associated with the computing cluster (or an associated algorithm) wherein the metric is usable to determine whether a processing time to complete each of the last predetermined number (N) of processing requests exceeds a maximum time or an average time for the algorithm associated with the computing cluster.

Accordingly, using clusters, such as those illustrated in FIG. 2, at startup of each application, one or more server processes are created as described above with respect to FIG. 1. Furthermore, a computing cluster is created for each algorithm, wherein the computing cluster includes one or more processing nodes of a computing system and is associated to the set of server processes created for the algorithm. Each of the one or more processing nodes includes a physical machine or a virtual machine. Also, in some embodiments, each computing cluster includes a scalable number of processing nodes. For example, the number of processing nodes may be scaled (dynamically) based on an average number of processing requests processed by each algorithm. In some embodiments, each processing node runes one server process. Furthermore, in some embodiments, each computing cluster is implemented on a separate virtual or physical machine from other computing clusters.

One or more models are also loaded into the memory associated with each of the plurality of server processes as also described above with respect to FIG. 1. Thereafter, each algorithm is executed on its respective computing cluster and the analysis results are output as described above.

Figure 3:
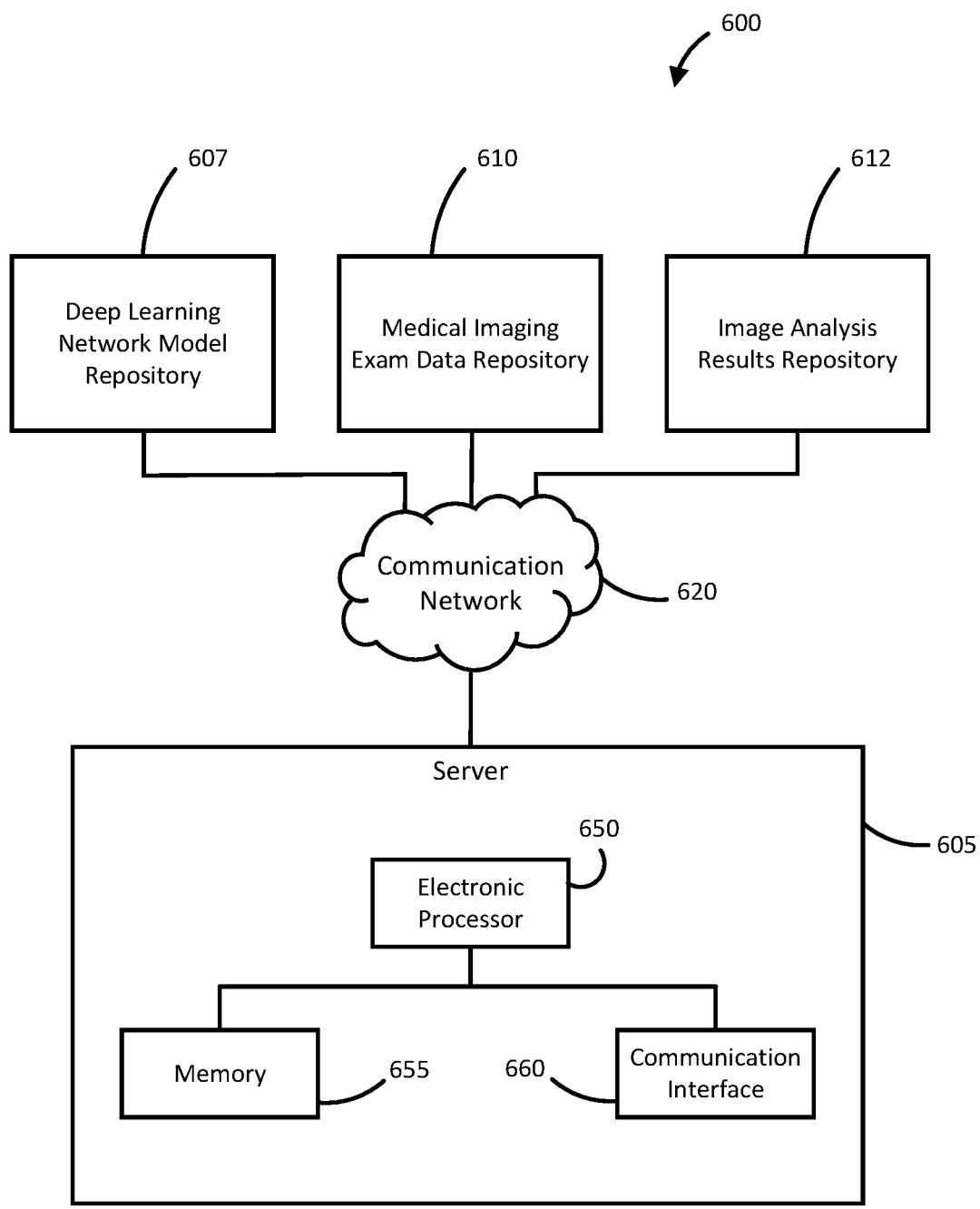
FIG. 3 illustrates a computing system for processing medical image exams using a plurality of deep learning models according to some embodiments.

It should be understood that the functionality described herein can be performed via one or more computing devices, such as one or more servers. For example, FIG. 3 illustrates a computing system 600 for processing medical image exams using a plurality of deep learning models. As illustrated in FIG. 3, the system 600 includes a server 605, a deep learning network model repository 607, a medical imaging exam data repository 610, and an image analysis results repository 612. The server 605, the deep learning network model repository 607, the medical imaging exam data repository 610, and the image analysis results repository 612 communicate over one or more wired or wireless communication networks 620. Portions of the wireless communication networks 620 may be implemented using a wide area network, such as the Internet, a local area network, such as a Bluetooth™ network or Wi-Fi, and combinations or derivatives thereof. It should be understood that the system 600 may include more or fewer servers and the single server 605 illustrated in FIG. 3 is purely for illustrative purposes. For example, in some embodiments, the functionality described herein is performed via a plurality of servers in a distributed or cloud-computing environment. Also, in some embodiments, the server 605 may communicate with multiple deep learning network repositories, multiple medical imaging exam data repositories, multiple image analysis results repositories, or a combination thereof. Furthermore, in some embodiments, these components may be combined and distributed in various configurations. For example, in some embodiments, one or more of the deep learning network model repository 607, the medical imaging exam data repository 610, the image analysis results repository 612, or a combination thereof is combined with the server 605. Also, in some embodiments, the components illustrated in the system 600 may communicate through one or more intermediary devices (not shown).

As illustrated in FIG. 3, the server 605 includes an electronic processor 650, a memory 655, and a communication interface 660. The electronic processor 650, the memory 655, and the communication interface 660 communicate wirelessly, over wired communication channels or buses, or a combination thereof. The server 605 may include additional components than those illustrated in FIG. 3 in various configurations. For example, in some embodiments, the server 605 includes multiple electronic processors (such as multiple CPUs, GPUs, or a combination thereof), multiple memory modules (some of which may be integrated with the electronic processor, such as in the case of a GPU), multiple communication interfaces, or a combination thereof. Also, it should be understood that the functionality described herein as being performed by the server 605 may be performed in a distributed nature by a plurality of computers located in various geographic locations. For example, the functionality described herein as being performed by the server 605 may be performed by a plurality of computers included in a cloud-computing environment.

The electronic processor 650 may be a microprocessor, such as a CPU or GPU, an application-specific integrated circuit (ASIC), and the like. The electronic processor 650 is generally configured to execute software instructions to perform a set of functions, including the functions described herein. The memory 655 includes a non-transitory computer-readable medium and stores data, including instructions executable by the electronic processor 650. In some embodiments, the memory 655 is included in the electronic processor 650, such as a GPU, and memory 655 may also store the network models 115. The communication interface 660 may be, for example, a wired or wireless transceiver or port, for communicating over the communication network 620 and, optionally, one or more additional communication networks or connections.

While the above systems and methods are described as being applied to the processing of medical imaging exams with deep learning networks, one of ordinary skill in the art would easily recognize how the described systems and methods could apply to other data processing performed with other types of models or networks, such as text or natural language processing and other media processing.

Various features and advantages of the invention are set forth in the following claims.

What is claimed is:

1. A computer-implemented method for medical image processing, the computer-implemented method comprising:
   in response to startup of an application using an algorithm configured to process medical images:
      creating a server process supporting a programming language associated with the algorithm, and
      loading a plurality of models used by the algorithm into a memory of the server process to create in-memory models, wherein the plurality of models are based on the same or different deep learning frameworks;
   processing a first set of one or more medical images with the server process using the algorithm and at least one model selected from the in-memory models;
   outputting at least one result of the processing of the first set of one or more medical images;
   maintaining the in-memory models in the memory of the server process after processing the first set of one or more medical images;
   in response to a request to process a second set of one or more medical images, processing the second set of one or more medical images using the algorithm and at least one of the in-memory models;
   executing the server process to process one or more additional sets of one or more medical images until explicitly terminated by the application.

2. The computer-implemented method of claim 1, wherein creating the server process includes running the server process on a central processing unit and a graphics processing unit.

3. The computer-implemented method of claim 1, wherein creating the server process includes running the server process on a plurality of central processing units or a plurality of graphics processing units.

4. The computer-implemented method of claim 1, wherein the server process is a first server process and further comprising creating a second server process supporting a different programming language associated with a second algorithm, the second algorithm associated with a second plurality of models, wherein the first server process and the second server process are run on different processing nodes.

5. The computer-implemented method of claim 4, wherein the different processing nodes includes different physical machines or different virtual machines.

6. The computer-implemented method of claim 1, wherein the server process is a first server process and further comprising creating a second server process supporting a different programming language associated with a second algorithm, the second algorithm associated with a second plurality of models, wherein the first server process and the second server process are run on the same processing node.

7. The computer-implemented method of claim 1, further comprising, in response to the startup of the application:
   creating a second server process supporting a second programming language, and
   loading a second plurality of models used by the algorithm into the memory of the server process to create second in-memory models, each model in the second plurality of models associated with the second programming language.

8. The computer-implemented method of claim 1, wherein loading the plurality of models into the memory of the server process to create the in-memory models includes allocating a model included in the plurality of models to one of a central processing unit (CPU) associated with the server process and a graphical processing unit (GPU) associated with the server process.

9. The computer-implemented method of claim 8, wherein allocating the model includes allocating the model based on at least one selected from a group consisting of an amount of memory needed for the model, a size of an image included in the first set of one or more medical images, a temporary amount of memory needed to process a digital image with the model, a framework used to build the model, and a user preference.

10. The computer-implemented method of claim 8, wherein allocating the model includes allocating the model to a fraction of the GPU.

11. The computer-implemented method of claim 1, wherein maintaining the in-memory models in the memory of the server process includes maintaining the in-memory models in the memory until termination of the server process.

12. The computer-implemented method of claim 1, further comprising outputting at least one result of the processing of the second set of one or more medical images.

13. The computer-implemented method of claim 1, wherein the server process is a first server process and further comprising creating a second server process supporting a programming language associated with a second algorithm, wherein the first server process is executed in parallel with the second server process.

* * * * *